United States Patent [19]

Himmelbauer et al.

[11] Patent Number: 4,535,200
[45] Date of Patent: Aug. 13, 1985

[54] CORDLESS TELEPHONE SYSTEM WITH SECURITY CODING

[75] Inventors: Alain J. Himmelbauer, Lognes; Régis J. P. Poubelle, Gretz, both of France

[73] Assignee: U.S. Philips Corporation, New York, N.Y.

[21] Appl. No.: 571,224

[22] Filed: Jan. 16, 1984

[30] Foreign Application Priority Data

Jan. 24, 1983 [FR] France ............................... 83 01036

[51] Int. Cl.³ ........................ H04Q 7/04; H04M 1/66
[52] U.S. Cl. ................................... 179/2 EA; 179/2 E
[58] Field of Search ............................ 179/2 E-2 EC, 179/18 DA, 90 D; 455/77, 88-90; 340/825.31-825.33, 825.44

[56] References Cited

U.S. PATENT DOCUMENTS 4,422,071 12/1983 de Graaf ........................ 340/825.44
4,436,957 3/1984 Mazza et al. ..................... 179/2 EA
4,467,140 8/1984 Fathauer et al. ................. 179/2 EA Primary Examiner—Gene Z. Rubinson
Assistant Examiner—W. J. Brady
Attorney, Agent, or Firm—Thomas A. Briody; William J. Streeter

[57] ABSTRACT

An arrangement for telephone communication via a radio-electric link, characterized in that it is formed by a base unit and a mobile unit which form the fixed part of the arrangement and its optionally movable part, respectively, that the base unit comprises primarily an interface module for the connection to the telephone network, a first radio-electric module for transmitting to the mobile unit signals coming from the telephone network, and for receiving and conveying to this network signals coming from the mobile unit and a first processing module, that the mobile unit (20) comprises primarily a second radio-electric module (220) for transmitting speech signals to the base unit and for receiving signals coming from the telephone network via the base unit, and a second processing module (240) and that the base unit and the mobile unit each comprise a multiplexer and also a contact for interconnecting them during the previous storage by the user in the memory from the mobile part a personal, characteristic code which makes it possible that only the communications between the said mobile unit and the said base unit are enabled.

4 Claims, 2 Drawing Figures

CORDLESS TELEPHONE SYSTEM WITH SECURITY CODING

BACKGROUND OF THE INVENTION

The present invention relates to an arrangement for telephone communication via a radio link.

Arrangements enabling the establishment of telephone links without any cord between the base unit and the handset, which consequently has the advantage of being really movable, have been known for some time already. A distinction must, however, be made between two types of cordless telephone communication arrangements: namely the conventional arrangement in which dialling is effected on the base unit, calls and ending the communication only being possible by decoupling and recoupling this base unit and the mobile part, and on the other hand the more recent arrangements in which calls, dialling and ending the communication can be effected from the mobile part. The invention described in the present patent application belongs to this second type of arrangement.

SUMMARY OF THE INVENTION

Put more accurately, the invention has for its object to provide a telephone communication arrangement via a radio link formed on the one hand by a fixed part called the base unit and formed more specifically by an interface module for connection to the telephone network, a first radio-electric module for transmitting to the mobile part signals coming from the telephone network and for receiving and conveying signals coming from the mobile part to this network, and a first processing module comprising a first microprocessor and a first memory, and on the other hand by an optionally movable part forming a complete telephone set, called the mobile unit and formed more specifically by a second radio-electric module, for transmitting speech signals to the telephone network via the base and for receiving signals coming from this network also via the base, and a second processing module comprising a programming keyboard, a second microprocessor and a second memory. The base and the mobile part are inter alia each provided with a multiplexer and a contact for interconnecting them during the previous programming operation of the arrangement by the user; this programming operation is effected by writing into the memory, from the mobile part, a personal code which is characteristic of the user, and is stored in the first and second memories and intended to enable only communications between this mobile part and this base unit, which memories are electrically erasable and reprogrammable.

DESCRIPTION OF THE DRAWINGS

Particulars and advantages of the invention will become more apparent from the following description given by way of non-limitative example with reference to the accompanying drawings, in which.

DESCRIPTION OF THE PREFERRED EMBODIMENTS

Figure 1:
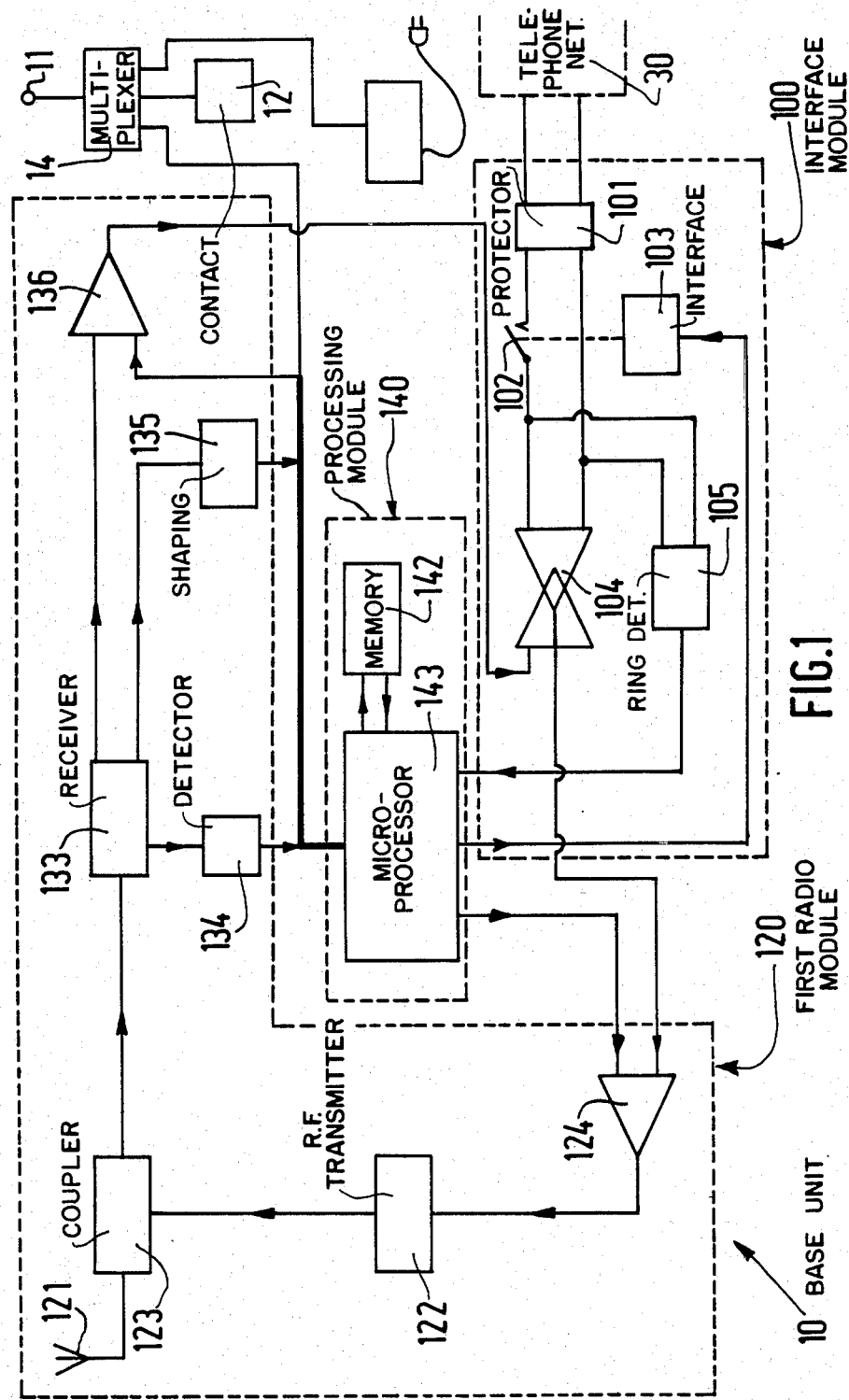
FIGS. 1 and 2 show the fixed part, or base unit, and the movable part, or mobile handset of the arrangement, respectively.
Figure 2:
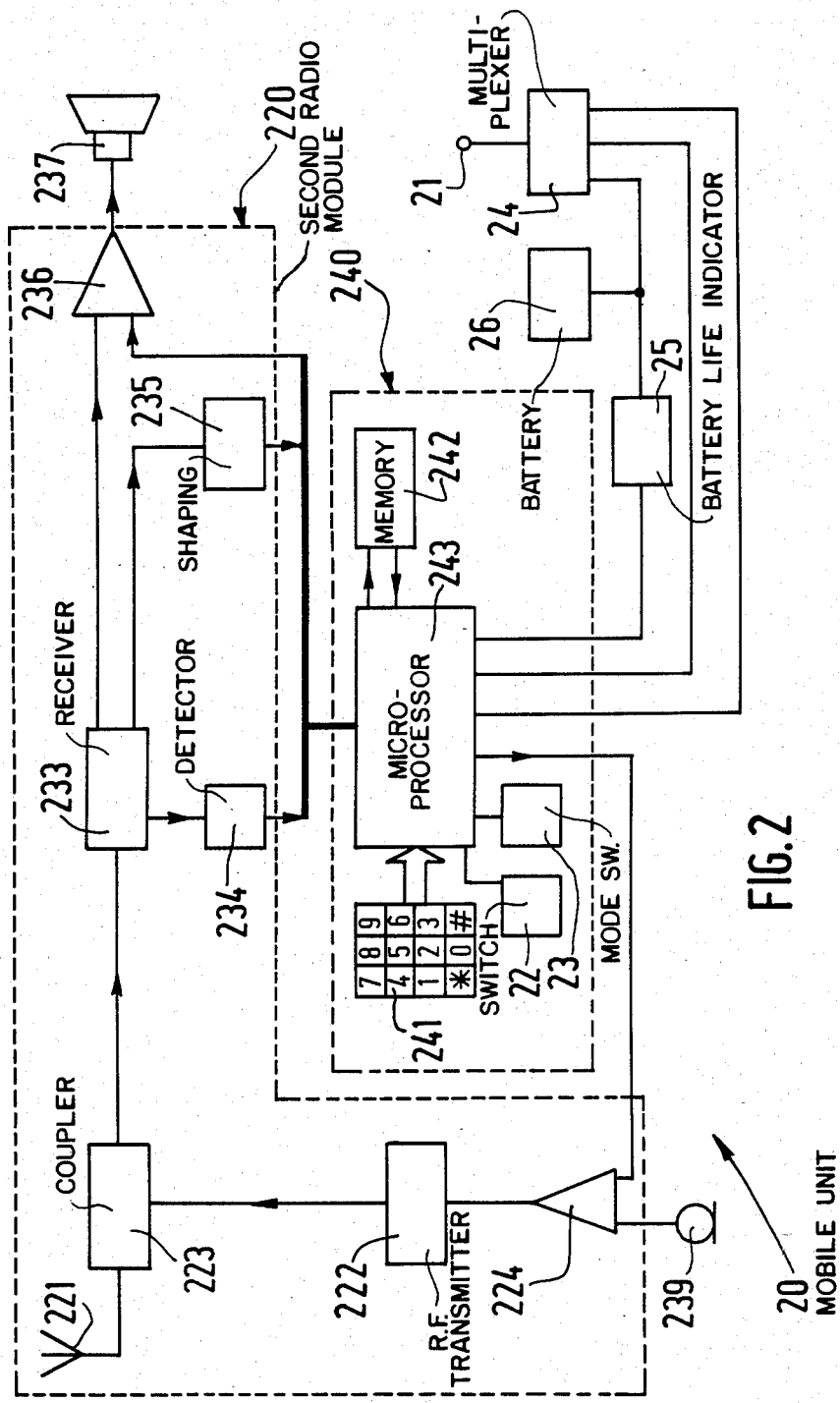

This arrangement according to the invention is formed by a fixed part, called base unit, which is connected to the conventional telephone network, and a movable part called mobile handset, which forms a complete telephone set. This base denoted by reference numeral 10 and shown in FIG. 1 is formed by a given number of modules: an interface module 100, a first radio module 120, a first processing module 140. Similarly, the mobile part denoted by 20 and shown in FIG. 2 comprises a second radio module 220 and a second data management module 240.

For a proper operation of this arrangement three types of procedures can be distinguished which will be described sequentially: the programming of a personal code (corresponding to only one specific user and selected by him), the reception of a call, transmitting a call.

When proper operation of the arrangement is ensured by connecting the base 10 to the telephone network 30 and to the current distributing section, the previous programming of a personal code is only possible on the one hand when the mobile part 20 is in the charge position, that is to say connected to the base via a multiplexer 24 and a contact 21 (the corresponding contact in the base with which also a multiplexer 14 is associated being denoted by reference numeral 11), and on the other hand when change-over to the "programming" mode has been effected with the aid of a contact 12 provided in the base for controlling the appropriate setting of the multiplexers 14 and 24. The user then keys-in on a programming keyboard 241 provided on the mobile part 20, the number chosen by him (here a number consisting of six figures) which will serve as his personal, secret code. Once the last figure has been keyed-in, a signal sounds, indicating that the programming action has been terminated and that the figures forming the personal code have been stored in the memories 142 and 242 provided in the base 10 and in the mobile part 20, respectively; these memories have the properties that they are electrically erasable and reprogrammable (so-called EAROM or EEROM memories). After the multiplexer 14 has been reset to the "rest" position, the arrangement is in the operating mode (it will not be necessity to effect a new programming operation until the personal code has fraudulently or accidentally been appropriated by an unauthorized person), both for transmitting a call and for receiving a call. For either of these two operations the mobile part 20 may or may not be on-hook (actually, more often than not, the mobile handset will be in the off-hook condition). Let it be assumed hereinafter that the mobile handset is at a certain distance from the base unit and in the stand-by condition, characterized by adjusting a go-stop switch 22 to the "go" position and adjusting a stand-by/operating mode switch 23.

When a call from an outside caller arrives at the base 10 via the telephone network, a voltage of a high value (here higher than 50 V), and having the frequency of the telephone sector, is received by a ringing signal detector 105, which conveys this information to the microprocessor 143. The latter takes the personal code from the memory 142 (actually, each time voltage is applied to the arrangement, the code is systematically transferred from this memory 142 to the volatile main memory of the microprocessor) and transmits it to the aerial 121 via an amplifier 124, a radio-frequency transmitter 122 and an aerial coupler 123. This signal which is received in the mobile part by a radio-frequency receiver 233, is transmitted via a shaping circuit 235 to a microprocessor 243 which compares the code received to the code stored in the memory 242 (actually, replaced, as in the foregoing into the volatile main memory of the microprocessor each time voltage is applied to it). If these two codes are identical, the microprocessor 243 instructs the amplifier 236 to excite a loudspeaker 237 which simulates the ringing signal in the mobile, while the transmitter 122 of the base unit stops and its receiver 133 listens-in for any return frequency.

The user who intercepts the call signals by adjusting on the mobile part the stand-by/operating mode switch 23 to the "operating" position, and the microprocessor 243 control the sending of an encoded radio-electric signal which corresponds to the information "call collected" to the aerial 221 via an amplifier 224, a radio-frequency transmitter 222 and the aerial coupler 223. The signal thus transmitted is received by the receiver of the base unit 10, thereafter shaped in a circuit 135 before it is applied as a data signal to the microprocessor 143 which identifies the number thus received and authorizes access to the telephone network 30, (via the amplifier 136) if the code is correct. This access to the telephone network is expressed by the fact that the apparatus stops ringing and also by closure of the line contact 102 by means of the interface circuit 103 (which warns the central exchange that the line is taken for a communication, to bring the caller and the person called in contact).

The low-frequency modulation of the called set, originating from the microphone 239 of the mobile unit, is transmitted to the base unit by means of the amplifier 224, the transmiter 222, the aerial coupler 223 and the aerial 221, is thereafter received in the receiver 133 of the base unit and transmitted to the telephone network 30 via the 2-wire/4-wire coupling circuit 104. The modulation originating from the telephone line—that is to say from the caller—is transmitted via this same circuit 104 to the amplifier 124, to the transmitter 122 of the base unit, and thereafter to the aerial 121 via the antenna coupler 123. The radio signal thus transmitted arrives at the receiver 233 of the mobile part and is thereafter transmitted to the loudspeaker 237 via the amplifier 236. If, to close the communication, the person called presets the stand-by operating mode switch 23 to the "stand-by" position, the microprocessor 243 transmits to the base unit the personal code together with an end-of-communication identification information; if it is the caller who terminates the conversation, the person called, who hears the corresponding signaling tone, needs only to reset the stand-by operating mode switch 23 to the "stand-by" position, in order to terminate the conversation on his part.

For an outgoing call, initiated by the mobile unit, the procedure is identical. To make his intentions known, the caller moves the stand-by/operating mode switch 23 to the "operating" position, which controls the transmission of the personal code to the base unit. This personal code is checked by the microprocessor 143 of the base unit by comparing it to the personal code stored in the memory in the base unit and if these two codes are identical, access to the telephone network 30 is authorized and the corresponding dialling tone is then audible in the receiver 237 of the mobile unit. The person called composes the number of the caller by depressing the appropriate keys of the keyboard 241, the figures of this number then being transmitted to the base unit together with a fraction of the personal code (in other embodiments the entire code might be transmitted) so as to prevent a base unit from being dialled fraudulently or accidentally by an other mobile unit. At the end of the communication thus established, resetting the stand-by operating mode switch 23 to the "stand-by" position induces the transmission of the personal code together with an information indicating that the communication is interrupted, and, thereafter, the telephone line is cleared.

Carrier detection circuits 134 and 234 are provided in the base unit and in the mobile unit. When these circuits no longer detect the presence of a carrier, the line is cleared at the end of a time period of shorter or longer duration. Such conditions are created when the base unit and the mobile unit leave the zone of the useful radius or when a lack of power (the batteries are discharged, for example) render the transmission of the communication interrupt code impossible.

It is equally useful to provide in the base unit 10 or in the mobile unit 20 auxiliary circuits such as, for example, a protection circuit 101 comprising fuses and overvoltage protection means or, in the mobile unit, a circuit 25 furnishing an indication about the extent to which the battery 26 of the mobile unit is fully charged or discharged.

What is claimed is:

1. An arrangement for telephone communication by means of a radio-electric link, said link being formed by a base unit and a mobile unit which constitute the fixed part of the arrangement and its optionally movable part, respectively, said base unit comprises an interface module for the connection to the telephone network, a first radio-electric module for transmitting to the mobile unit signals coming from the telephone network and for receiving and conveying to this network signals coming from the mobile unit, and a first processing module formed by a first microprocessor and a first memory, said mobile unit comprises a second radio-electric module for transmitting speech signals to the base unit and for receiving signals coming from the telephone network via the base unit, and a second processing module formed by a programming keyboard, a second microprocessor and a second memory, said base and mobile units each comprise a multiplexer and also a contact for interconnecting them during a pre-operational, start-up procedure wherein storage in said memories by the user of a personal, characteristic code is accomplished, said code being input via said programming keyboard of said mobile unit and stored simultaneously in the memories of the base and the mobile units, this personal code assuring that only communications between said mobile unit and said base unit are enabled.

2. An arrangement as claimed in claim 1, where in the case of a call sent to a person called, the radio-electric link which ensures the transmission of the call number of this called person simultaneously ensures the transmission of one of the entire and a fraction of the personal code from the mobile unit to the base unit.

3. An arrangement as claimed in claim 1 wherein said memories are electrically erasable and reprogrammable.

4. A cordless telephone comprising:
a base unit, said base unit including: an interface module for connection to a telephone network; a first radio-electric module for transmitting by radio signals coming from said telephone network and for receiving radio signals and conveying said received radio signals to said telephone network; a first processing module having a first microprocessor and a first memory; and first contact means for inputting to said first processing module;

a mobile unit including: a second radio-electric module for receiving said signals from said telephone network transmitted by said base unit, and transmitting speech from a user by radio signals to said first radio-electric module of said base unit, said transmissions and receptions between said base unit and said mobile unit being accomplished without interconnecting wires; said mobile unit further including: a second processing module having a programming keyboard, a second microprocessor and a second memory; and second contact means for inputting to said second processing module and interconnecting said mobile unit with said first contact means of said base unit, means for entering characteristic code keyboard inputs into said first and second memories for storage, said keyboard coded inputs being stored substantially simultaneously in said memories when said first and second connections are interconnected;

means in said base and mobile units for comparing the characteristic code in said first memory with the characteristic code stored in said second memory upon the initiation at said mobile unit of any outgoing telephone call or on initial reception at said mobile unit of any incoming telephone call transmitted from said base unit;

means for preventing outgo or reception of a call when said characteristic codes in said base and mobile units are compared by said means for comparing and found to differ.

* * * * *